United States Patent
Van Goch

(10) Patent No.: US 11,479,161 B2
(45) Date of Patent: Oct. 25, 2022

(54) METHOD FOR SECURING PACKING UNITS, AND FIXING HOLDER FOR USE IN THE METHOD

(71) Applicant: INVAGO B.V., PB Oud-Beijerland (NL)

(72) Inventor: André Van Goch, BP Oud-Beijerland (NL)

(73) Assignee: INVAGO B.V., BP Oud-Beijerland (NL)

( * ) Notice: Subject to any disclaimer, the term of this patent is extended or adjusted under 35 U.S.C. 154(b) by 261 days.

(21) Appl. No.: 16/754,552

(22) PCT Filed: Oct. 8, 2018

(86) PCT No.: PCT/NL2018/050662
§ 371 (c)(1),
(2) Date: Apr. 8, 2020

(87) PCT Pub. No.: WO2019/074359
PCT Pub. Date: Apr. 18, 2019

(65) Prior Publication Data
US 2020/0255199 A1    Aug. 13, 2020

(30) Foreign Application Priority Data

Oct. 9, 2017 (NL) ...................... 1042574

(51) Int. Cl.
*B60P 7/08* (2006.01)
*B60P 7/12* (2006.01)

(52) U.S. Cl.
CPC .............. *B60P 7/12* (2013.01); *B60P 7/0823* (2013.01); *B65D 2571/00055* (2013.01); *B65D 2571/00117* (2013.01)

(58) Field of Classification Search
CPC ........... B60P 7/0823; B60P 7/12; B60P 3/035; B60P 7/135; F16B 2200/50
(Continued)

(56) References Cited

U.S. PATENT DOCUMENTS 2,810,171 A    10/1957    Brooks et al.
4,487,537 A *  12/1984    Morse .................. B60P 7/12
                                                    410/99

(Continued)

FOREIGN PATENT DOCUMENTS

EP    2399843 A1    12/2011
GB    2267477 A     12/1993
WO    2014177506    11/2014

*Primary Examiner* — Stephen T Gordon
(74) *Attorney, Agent, or Firm* — Tarolli, Sundheim, Covell & Tummino LLP

(57) ABSTRACT

Method for securing packing units 20 on a transport vehicle 21, the packing units comprising a base 22 and at least two upright joined round containers 2a, 2b, the method comprising the steps of: providing a first fixing holder 1' on the upright circumferential edges 5 of two upright joined containers 2a, 2b of a first packing unit 20', providing a second fixing holder 1' on two upright circumferential edges of two upright joined containers 2a, 2b of the first packaging unit 20' or of a second packaging unit 20", arranging a tying strap or tensioning cable 8 over the fixing holders 1', 1", securing the first packing unit 20' with the tying strap or tensioning cable 8 on the transport vehicle 21.

10 Claims, 6 Drawing Sheets

(58) Field of Classification Search
USPC ......... 410/32–36, 39, 41, 42, 47–50, 78, 79, 410/97–100, 155
See application file for complete search history.

(56) References Cited

U.S. PATENT DOCUMENTS

| | | | | |
|---|---|---|---|---|
| 4,529,345 | A * | 7/1985 | Van Gompel | B60P 7/12 410/42 |
| 4,572,716 | A * | 2/1986 | West | B60P 7/12 410/42 |
| 9,302,607 | B1 | 4/2016 | Morrison | |
| 2003/0198527 | A1 * | 10/2003 | Galas | B60P 7/12 410/47 |

* cited by examiner

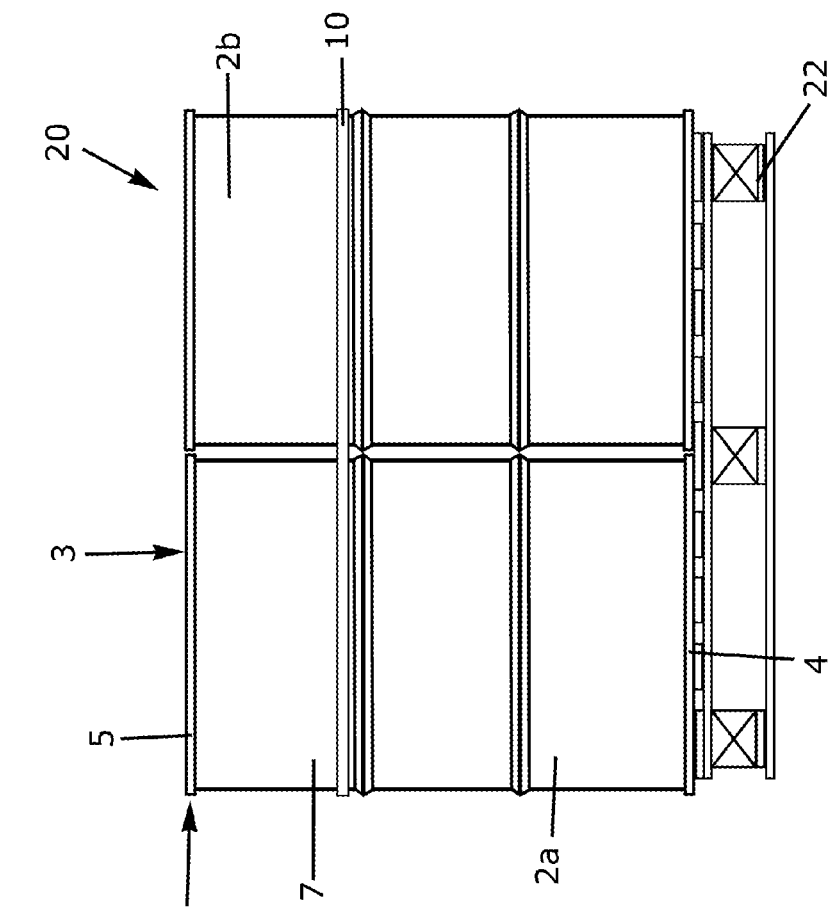
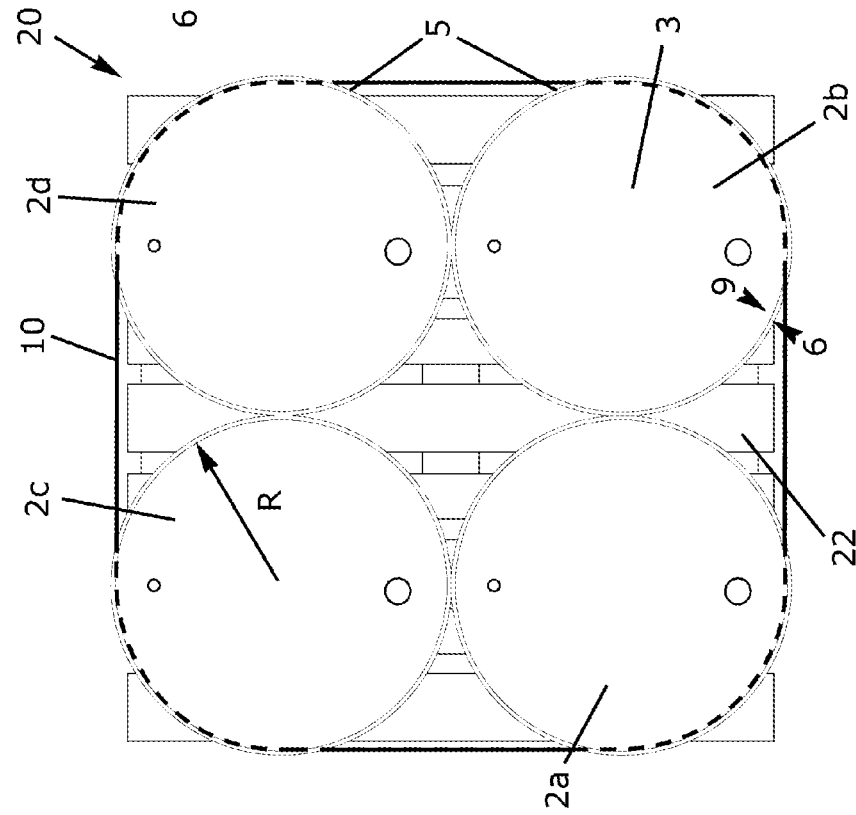

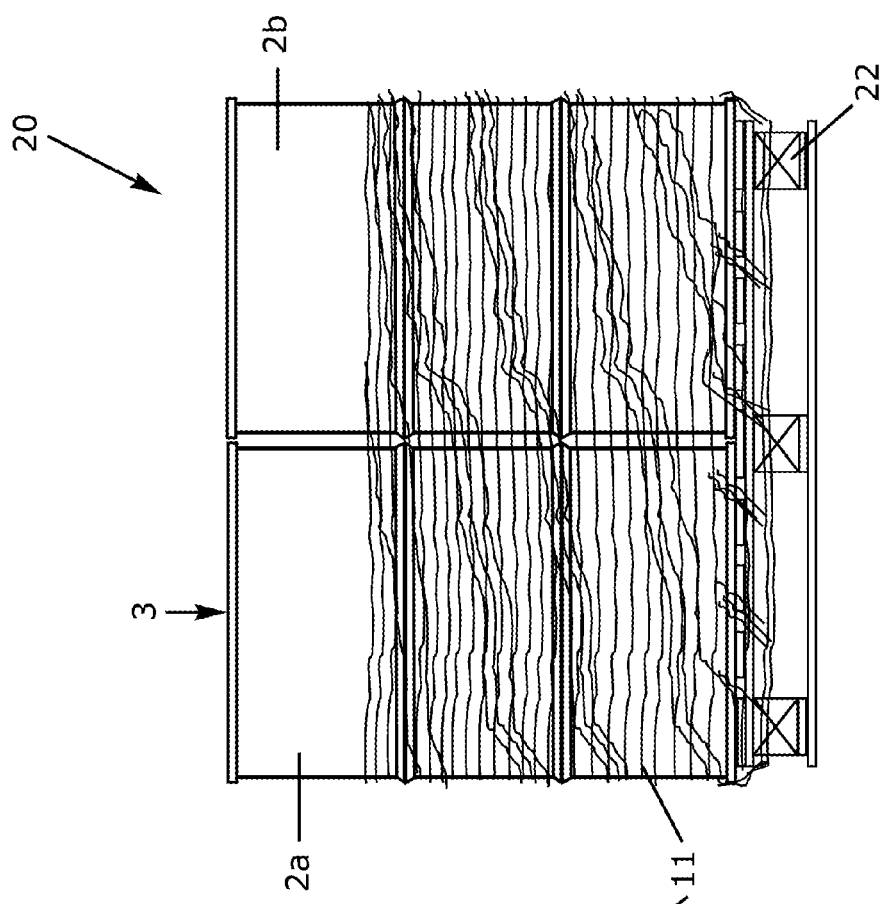
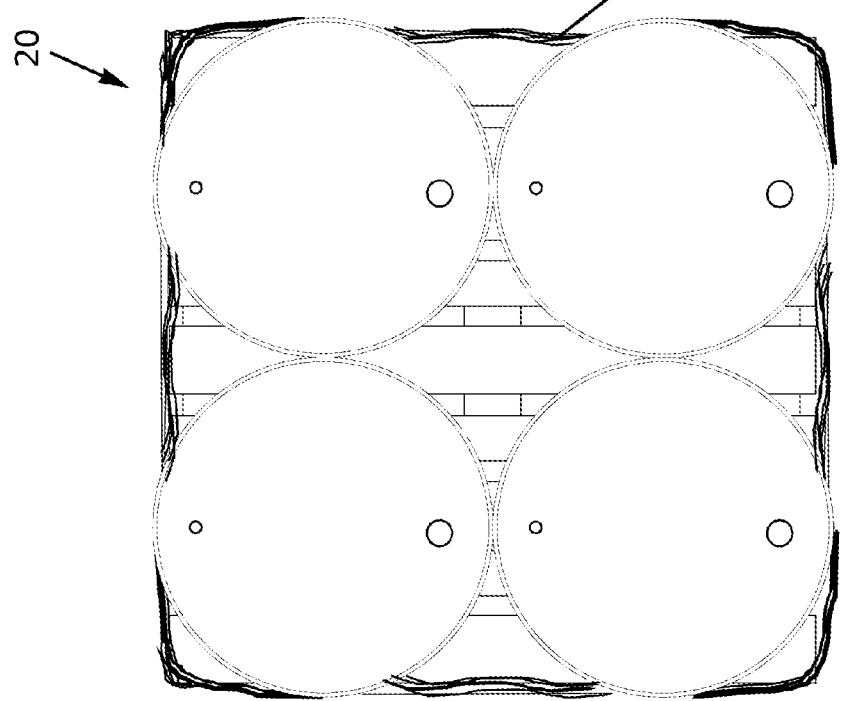
Fig.2B
Fig.2A

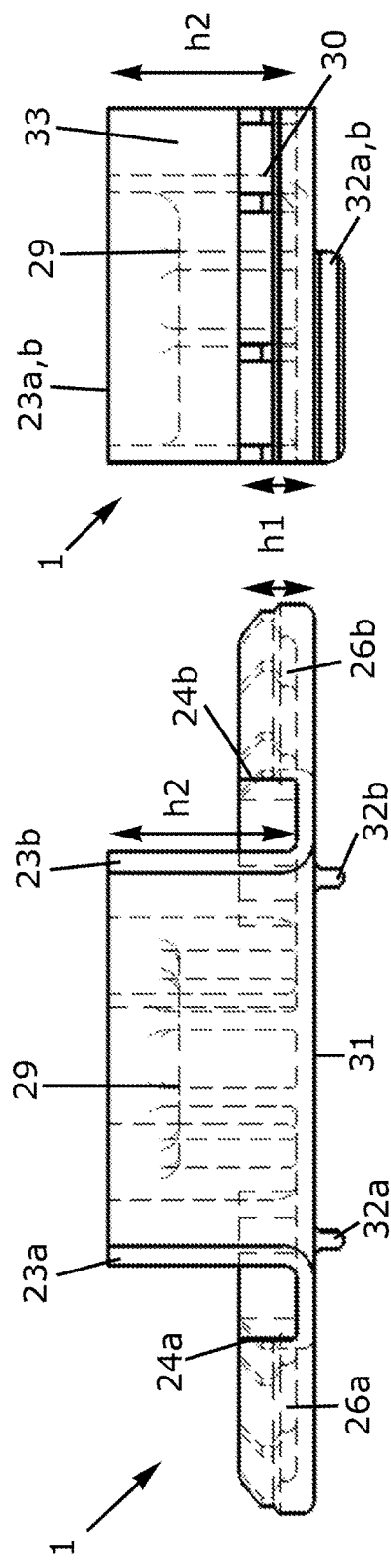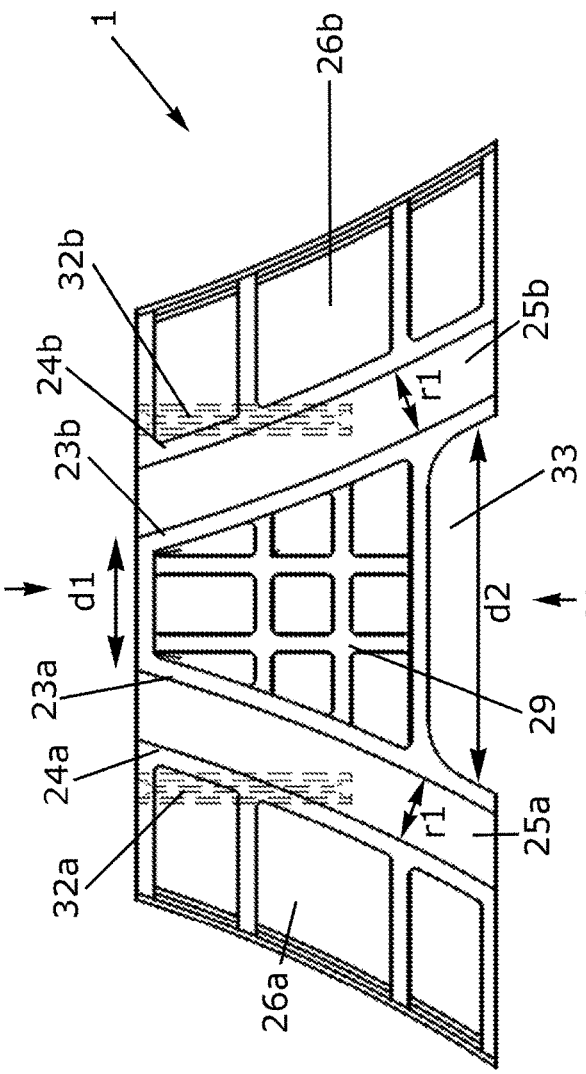

METHOD FOR SECURING PACKING UNITS, AND FIXING HOLDER FOR USE IN THE METHOD

RELATED APPLICATIONS

The present invention is a U.S. National Stage under 35 USC 371 patent application, claiming priority to Serial No. PCT/NL2018/050662, filed on 8 Oct. 2018; which claims priority of NL 1042574, filed on 9 Oct. 2017, the entirety of both of which are incorporated herein by reference.

The invention relates to a method for securing packing units on a transport vehicle, the packing units comprise a base and at least two upright, substantially round, containers. On the top side and the bottom side, the containers are provided with upright circumferential edges including rims, flange edges and ring edges, wherein the containers and their upright circumferential edges are positioned against one another on the base and the containers are held together by a cord strap or by otherwise enclosing or girding the containers, including using a (shrink) foil.

The object of the present invention is to provide a device and a method for ensuring that packing units with joined upright containers remain in place during transport in an efficient manner and with relatively simple and cheap means.

Object of the present method is to support a carrier (driver) in securing the cargo in the form of packing units having containers on a transport vehicle such as a truck. It is common practice for carriers to position (used) pallets on top of the joined containers or drums on the pallet in order to secure the containers to the cargo part of a transport vehicle (or a similar platform).

For transport, containers (also called drums or barrels) are placed in groups of four on a base such as a pallet. Then, the pallet is provided with belts (cord straps) or (shrink) foil so that the containers are not (or hardly) allowed to shift and move relative to one another on the pallet (fixing).

The pallets with the held together four containers (the packing units) are then positioned on a transport vehicle (for example with a forklift truck). The pallets are placed in a single or double row configuration on a trailer. As an example: in most situations transport vehicles are double loaded and 22 pallets are transported in two rows of 11 pallets comprising a total of 88 containers.

Subsequently, an additional pallet is placed on top of each package unit upon the containers. A tying strap is arranged over this top pallet (and over the two packing units with pallets placed in the width direction of the transport vehicle in case of double loaded vehicles). The tying straps are fastened to the attachment points of the transport vehicle. Then, the straps are tightened by the driver (with a force of approx. 350-400 kg). With a single row cargo configuration, a tying strap (including lashing or ratchet straps) holds four containers in position. With a double row cargo, a tying strap holds eight containers in position.

The carrier (driver) does not (usually) have any influence on the preparation of the containers to be transported. It is the responsibility of the carrier to ensure that irregularly packaged containers on pallets are safely transported with the transport vehicle. The abovementioned method has the disadvantage that 22 pallets of 22 kg (484 kg) must be placed on top of the loaded packing units. This costs fuel and time, and provides an undesirable physical burden to the driver. In addition, the 22 pallets often have to return with the transport vehicle after delivery of the cargo.

A number of methods and tools are known for securing containers on a base such as a pallet.

WO2014177506 (A) discloses a clamping device to be positioned between the containers for holding the containers together. Therefore, this clamping device is not suitable for securing packing units comprising joined, packaged upright containers, because the containers can no longer be displaced relative to each other, so that the clamping device cannot be arranged between the containers. Moreover, the clamping device shown is not suitable for use with wide (lashing) straps. A wide strap will easily damage and therefore needs to be replaced often for safety reasons.

GB2267477A discloses a spacer which is disposed between adjacent paper rolls on a pallet in order to protect the rolls during transport. Therefore, this spacer is also not suitable for securing packing units with held together, packaged upright containers, because it is not possible to arrange the spacer between the joined containers.

U.S. Pat. No. 9,302,607 discloses a belt holder for securing drums on a pallet. This belt holder is applied to the side opposite to the side in contact with a neighbouring drum. This has the disadvantage that for each (width) row of drums a strap must be applied, so that twice as many straps are necessary. Also two belt holders are used between two adjacent drums. This has the disadvantage that these belt holders cannot be arranged between already packaged and joined drums.

The object of the present invention is therefore to provide a method and a device with which already (irregularly) packaged and joined containers on a base can be easily secured on a transport vehicle, so that with a double row cargo by using one tying strap two packing units with eight containers can be secured safely, quickly and easily without much extra effort, while the straps do not touch the containers and will not get damaged easily.

These objects are achieved with the method according to the invention comprising the steps of:
providing a first fixing holder upon the upright circumferential edges of two upright joined containers of a first packing unit, the fixing holder being provided with two inner fixing edges to abut against the outer sides of the upright circumferential edges and against the outer walls of the two held together upright containers,
providing a second fixing holder on two upright circumferential edges of two upright joined containers of the first packing unit or of a second packing unit,
arranging a tying strap or tensioning cable over the fixing holders,
securing the first packing unit (and optionally the second packing unit) with the tying strap or tensioning cable on the transport vehicle.

The invention also relates to a fixing holder for securing packing units on a transport vehicle according to the new method.

The fixer holder comprises:
two inner fixing edges to abut against the outer side of the upright circumferential edges and against the outer walls of the two upright containers held together, two outer fixing edges to abut against the inner side of the circumferential edges of the two upright containers held together,
a first support surface between the first outer fixing edge and the first inner fixing edge, and a second support surface between the second outer fixing edge and the second inner fixing edge, wherein in the use position the support surfaces rest upon the upright circumferential edges of the joined containers, a first stiffening element at the first outer fixing edge and a second stiffening element at the second outer fixing edge, wherein the height of the outer fixing edges and the stiffening elements connected thereto is smaller than the height of the upright circumferential edges of the joined containers, so that in the use position the stiffening elements do not touch the top of the containers.

With these measures a fixing holder is obtained, which can be easily applied to already packed and joined containers, which holder weighs little and can be easily applied and removed again, on which holder the straps can be safely attached for securing the packing units on the transport vehicle without damaging the tying straps, and wherein the holder does not damage the top of the containers during transport and does not shift and/or break or kinks during transport.

Preferably, the front distance between the first and second inner fixing edges at the front side of the fixing holder has a value of 2%-20% of the radius of the container. With this measure the fixing holder is arranged at some distance from the point of contact between the joined containers, so that the fixing holder can always be easily placed and removed (during/after the transport) and will not be pinched between the containers.

In particular, the rear distance between the first and second inner fixing edges at the rear side of the fixing holder is at least 80% of the width of the tying strap or tensioning cable, and preferably the rear distance is chosen from the range of 110%-150% of the width of the tying strap or tensioning cable.

As a result, the tying strap is supported over its entire width and also remains fixed when the containers are positioned irregularly on the base. In addition, the tying strap is prevented from contacting the packing unit with the joined containers.

Preferably, the radial distance between the inner fixing edges and the outer fixing edges is 5%-30% greater than the radial thickness of the upright circumferential edges of the joined containers.

As a result, the fixing holder is easily placed upon the upright edges of the containers abutting one another and is also easily removed therefrom.

In particular, the height of the inner fixing edges is greater than the height of the outer fixing edges, preferably the ratio between heights of the inner fixing edge and the outer fixing edge has a range of 1.5:1-5.0:1. With this measure a fixing holder is obtained which supports well against the outer walls of the two containers and which does not contact the upper side of the containers, while the fixing holder is prevented to shift during transport.

Preferably, a central stiffening body is provided between the first inner fixing edge and the second inner fixing edge. This prevents the fixing holder from being deformed and from getting loose and falling off during transport.

Preferably, at the rear side of the fixing holder between the first inner fixing edge and the second inner fixing edge a bevelled or rounded guiding surface is provided for guiding the tying strap or tensioning cable.

This provides for a "smooth" guiding of the tying strap or tensioning cable when the fixing holder is tightened against the containers. Preferably, a part of the inner fixing edges is used as a flanged edge of the guiding surface, so that the tying strap remains positioned in the centre of the fixing holder.

In particular, two positioning ribs are provided on the top side of the fixing holder for the tying strap or tensioning cable, the distance between the ribs being equal to or greater than the width of the tying strap or tensioning cable. With these positioning ribs the tying strap can be easily and accurately fitted in the centre of the fixing holder.

The invention also relates to a system for securing packing units on a transport vehicle, the system comprising:
  a first packing unit, which comprises a base and at least two upright, substantially round containers, the containers are provided on the top side and at the bottom side with upright circumferential edges including flange edges and ring edges,
  wherein the containers and their upright circumferential edges are placed against one another on the base and the containers are held together by a cord strap or by otherwise enclosing or girdling the containers, including a (shrink) foil,
  a first fixing holder according to the invention, provided upon the upright circumferential edges of two upright joined containers of the first packing unit,
  a second fixing holder according to the invention, provided upon two upright circumferential edges of two upright joined containers of the first packing unit or of a second packing unit which is identical to the first packing unit,
  a tying strap or tensioning cable arranged over the fixing holders and secured to the transport vehicle.

The invention will now be further discussed with reference to the figure description below.

FIG. 1A-1B show a top view and side view of a packing unit with four containers held together by a cord strap;

FIG. 2A-2B show a top view and side view of a packing unit with four containers held together by a foil;

FIG. 6A, 6B, 6C show in bottom view, rear view and side view the fixing holder according to the invention.

Figure 3:
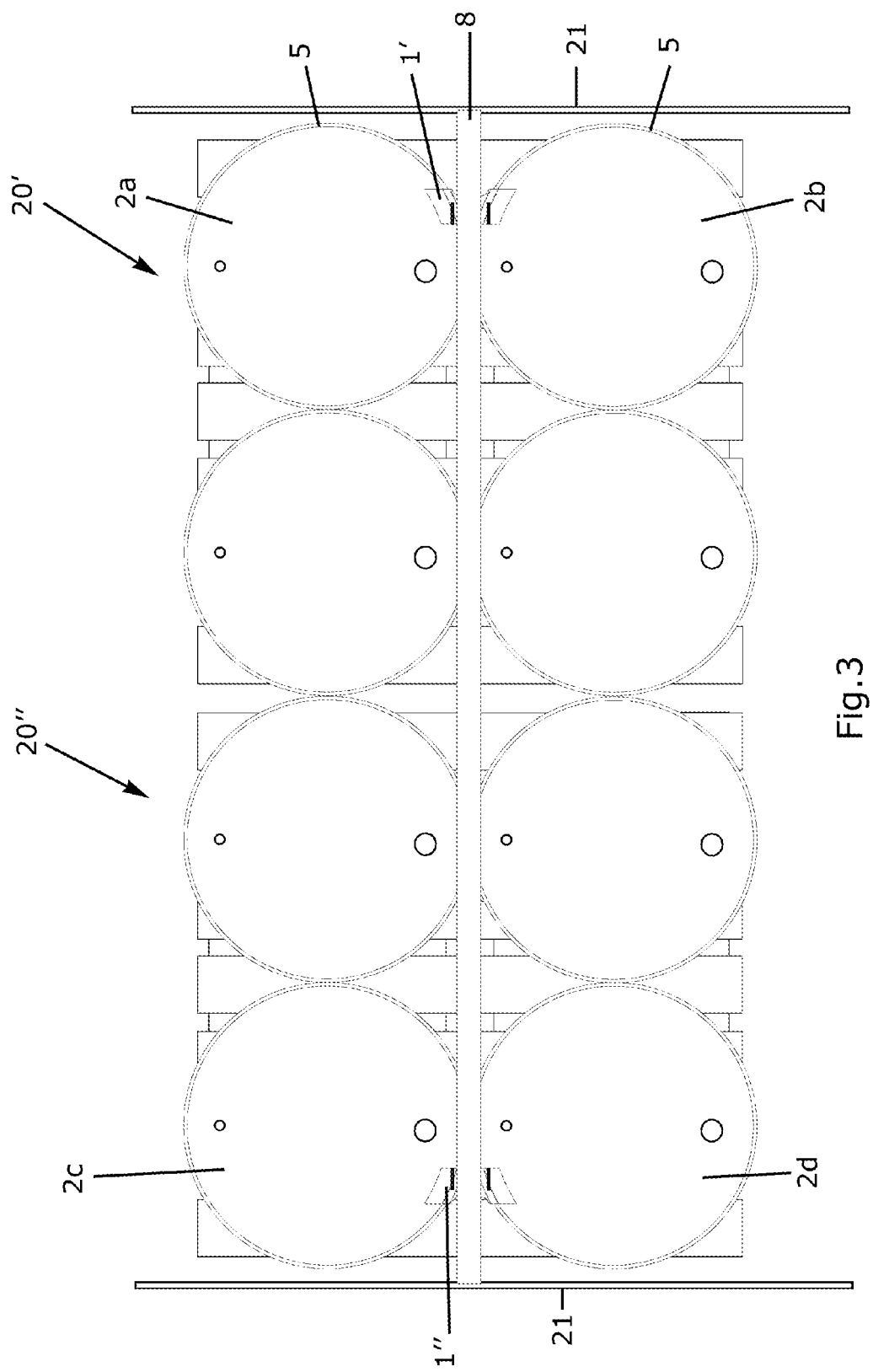
FIG. 3 shows in top view two packing units secured on a transport vehicle with the method and the fixing holder according to the invention.

FIGS. 1A-1B show a packing unit 20 which comprises a base 22 or pallet and four upright, substantially round, containers 2a, 2b, 2c, 2d positioned thereupon. The containers have a radius R. The containers are held together by a cord belt (cord strap) 10, which is arranged around the containers. As a result, the containers are abutting against one another. The containers or drums are provided with upright circumferential edges 5. In the exemplary embodiment shown, the containers with the upright circumferential edges 5 and outer walls 7 are abutting one another. The containers have a bottom side 4 and a top side 3. The upright circumferential edges have outer sides 6 and inner sides 9.

In FIGS. 2A-2B an alternative embodiment of the packing unit is shown, wherein the containers are held together or packed in a (shrink) foil 11. The upright circumferential edges 5 of the containers are also abutting against one another.

FIG. 3 shows the method according to the invention in which a first packing unit 20' and a second packing unit 20" are placed side by side in the width direction on the loading floor of a transport vehicle 21, such as a truck. The first packing unit 20' is provided with a first fixing holder 1' and the second packing unit is provided with a second fixing holder 1". The first fixing holder 1' is arranged between the two outer containers 2a, 2b of the first packaging unit 20', and the second fixing holder 1" is arranged between the two outer containers 2c, 2d of the second packaging unit 20".

The fixing holders 1',1" are arranged at some distance from the points of contact of the two containers 2a, 2b. A tying strap 8 is provided, which is arranged over the two fixing holders and which is fastened to the transport vehicle 21. By tensioning the tying strap 8, the fixing holders are pulled towards each other against the outer walls 7 and upright circumferential edges 5 of the containers so that both packing units are securely fixed on the transport vehicle. The special form of the fixing holder according to the invention ensures that the tying strap does not come into contact with the containers.

Figure 4:
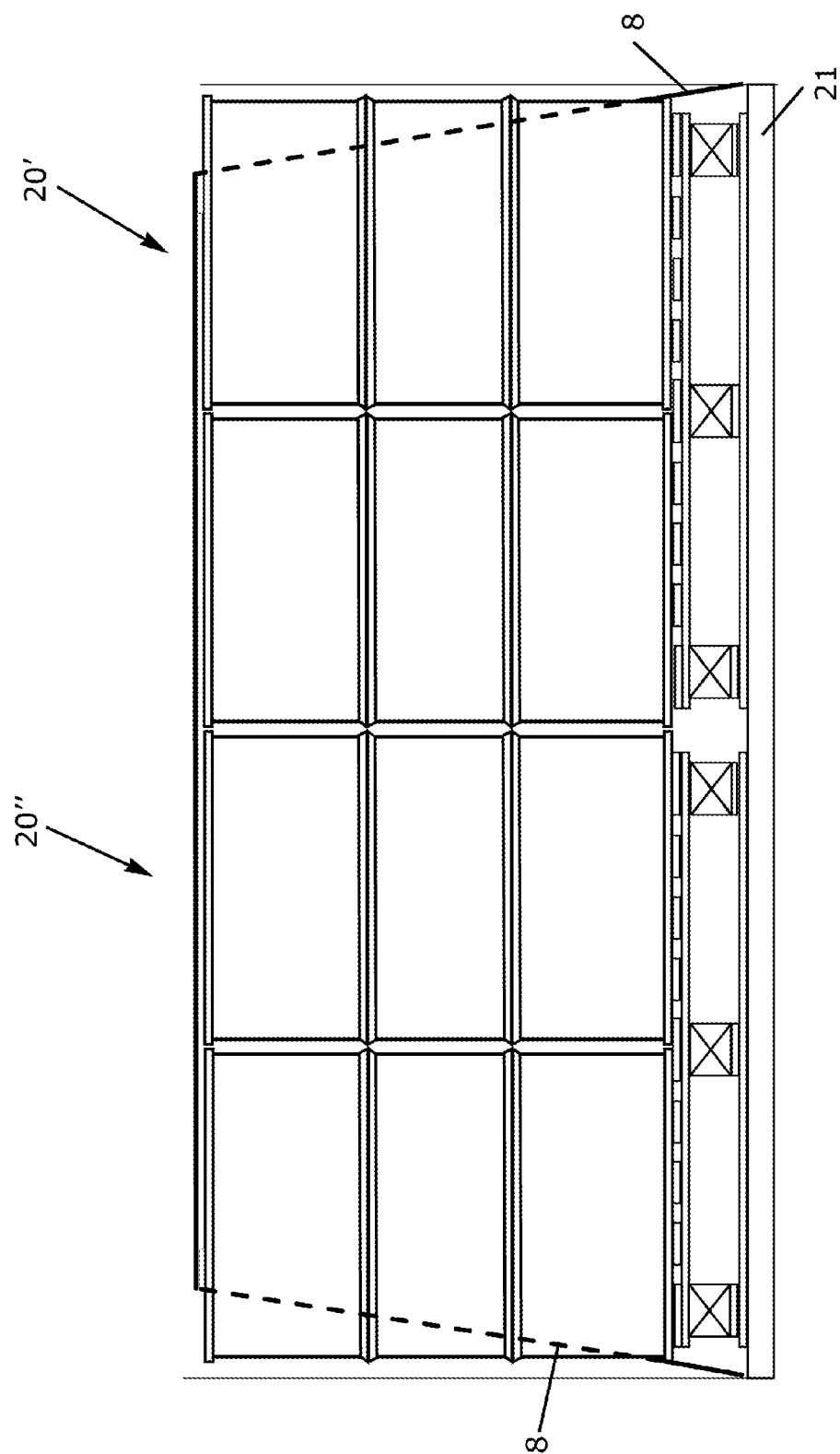
FIG. 4 shows in side view the packing units of FIG. 3.

FIG. 4 shows in side view the secured packing units 20', 20" on the transport vehicle 21. The tying strap 8 exerts its force on the upright circumferential edges and the upper part of the outer walls of the containers at some distance from the centre of the containers by the use of the fixing holder according to the invention.

Figures 5A, 5B:
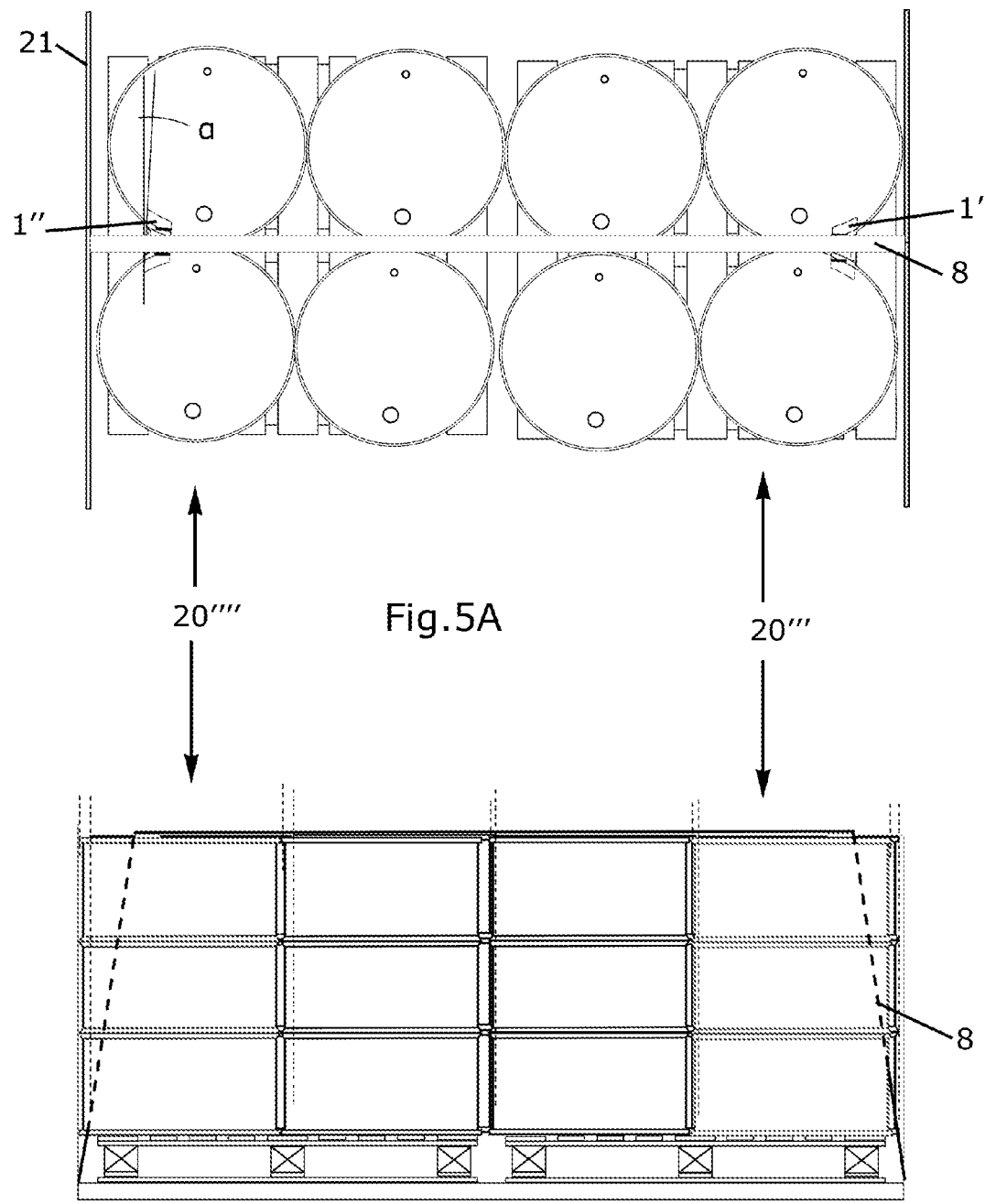
FIG. 5A-5B show in top view and side view two packing units with irregularly positioned containers.

FIG. 5A and FIG. 5B show in top view and side view that the method and fixing holder according to the invention are also suitable for irregularly packed containers in packing units 20''', 20''''. Because the containers have shifted relative to each other, the fixing holders 1', 1" will make an angle a relative to the side of the transport vehicle 21. In this situation, the tying strap 8 can still be easily fitted over the fixing holders 1', 1", and the packing units are safely secured on the transport vehicle 21.

FIGS. 6A, 6B, 6C show in bottom view, rear view and side view the fixing holder 1 according to the invention with two inner fixing edges 23a, 23b. These fixing edges are suitable to abut against the upright circumferential edges and against the outer walls of the two upright containers held together. For that purpose, the inner fixing edges 23a, 23b are provided with a circular shape and form a circle segment which corresponds to the round shape with radius R of the containers in the packing unit. The fixing holder further comprises two outer circumferential fixing edges 24a, 24b to abut against the inside of the circumferential edges of the two upright containers held together. With these outer fixing edges, during transport the fixing holder is prevented from falling and sliding off from the upright edges of the containers.

Furthermore, the fixing holder is provided with a first support surface 25a between the first outer fixing edge 24a and the first inner fixing edge 23a, and with a second support surface 25b between the second outer fixing edge 24b and the second inner fixing edge 23b. In the use position, as shown in FIGS. 3, 4 and 5A, the support surfaces 25a, 25b rest upon the upright circumferential edges 5 of the joined containers. The first outer fixing edge 24a is provided with a first stiffening element 26a, and the second outer fixing edge 24b is provided with a second stiffening element 26b. In this way the lateral forces exerted by the containers on the outer fixing edges can be accommodated and absorbed, so that the outer fixing edge does not break or loosens from the upright circumferential edge. The height h1 of the outer fixing edges 24a, 24b and the stiffening elements 26a, 26b connected thereto are smaller than the height of the upright circumferential edges of the joined containers, so that in the use position of the holder the stiffening elements 26a, 26b do not touch the containers and do not damage the containers.

In the bottom view of FIG. 6C is shown that at the front side 27 of the fixing holder the front distance d1 between the first and second inner fixing edges 23a, 23b has a minimum value of 2%-20% of the radius R of the container. As a result, the fixing holder remains at a distance of 3%-50% of the radius R of the containers from the location where the containers abut one another, so that the fixing holder can always be positioned and removed (during/after the transport) because now is prevented that the holder gets pinched or clamped as a result of movement of the containers during transport. The front distance d1 has a value of 0.5-5 cm with a standard (outside) radius R of the container (drum barrel) of about 26.5 cm.

At the rear side 28 of the fixing holder the rear distance d2 between the first and second inner fixing edges 23a, 23b is at least 80% of the width of the tying strap or tensioning cable 8 and therefore at least 4 cm when the tying strap has a width of 5 cm. The rear distance d2 is preferably selected from the range of 110%-150% of the width of the tying strap or tensioning cable 8 so that the tying strap is not in contact with the containers.

The radial distance r1 between the circular inner fixing edges 23a, 23b and the circular outer fixing edges 24a, 24b is 5%-30% greater than the radial thickness of the upright circumferential edges 5 of the joined containers 2a, 2b. As a result, the fixing holder is easily mounted upon the upright circumferential edges of the containers and is also easily removed.

The height h2 of the inner fixing edges 23a, 23b is greater than the height h1 of the outer fixing edges 24a, 24b. As a result, a large contact surface is created between the fixing holder and the outer walls 7 of the containers, while on the top side 3 of the containers the fixing holder only contacts the circumferential edges 5 and is not in contact with the top side 3 of the containers. The ratio between the height h2 of the inner fixing edge 23a, 23b and the height h1 of the outer fixing edge 24a, 24b is chosen between 1.5:1-5.0:1. It has been found that a height h2 of about 3 cm and a height h1 of about 1 cm provides for an optimum fixing holder.

A central stiffening body 29 is provided between the first inner fixing edge 23a and the second inner fixing edge 23b, so that the fixing holder does not deform during tightening of the tying strap and during transport.

At the rear side 28 of the fixing holder 1 between the first inner fixing edge 23a and the second inner fixing edge 23b, a bevelled or rounded guiding surface 30 is provided for guiding the tying strap or tensioning cable 8. Preferably, this guiding surface 30 is provided inwards in the direction of the front side 27, so that a receiving space 33 is formed by the guiding surface 30 and the first and second inner fixing edges 23a, 23b. On the top side 31 of the fixing holder two positioning ribs 32a, 32b are provided for the tying strap or tensioning cable 8, wherein the distance between the positioning ribs is equal to or greater than the width of the tying strap or tensioning cable 8.

In the use position of the first fixing holder and the tying strap, firstly the tying strap extends through the receiving space 33 from the underside of the transport vehicle and, via the rounded guiding surface 30 and the inside of the rounded inner fixing edges 23a, 23b, extends to the top side 31 of the fixing holder between the two positioning ribs 32a, 32b and continues to the second fixing holder.

The invention claimed is:

1. A method for securing packing units on a transport vehicle, the packing units comprise a base and at least two upright, substantially round, containers, on a top side and at a bottom side the containers are provided with upright circumferential edges including flange edges and ring edges, wherein the containers and their upright circumferential edges are positioned against one another on the base, and the containers are held together by a cord strap or by otherwise enclosing or girdling the containers, the method comprising:

providing a first fixing holder upon the upright circumferential edges of two upright containers held together of a first packing unit, the first fixing holder being provided with two inner fixing edges to abut against outer sides of the upright circumferential edges and against outer walls of the two upright containers held together;

providing a second fixing holder upon the upright circumferential edges of the at least two upright containers held together of the first packing unit or upright circumferential edges of at least two upright containers held together of a second packing unit;

arranging a tying strap or tensioning cable over the first and second fixing holders; and securing the first packing unit or the first packing unit and the second packing unit with the tying strap or the tensioning cable on the transport vehicle.

2. The method according to claim 1, wherein the first and second fixing holders comprise:

the two inner fixing edges to abut against the outer side of the upright circumferential edges and against the outer walls of the two upright containers held together;

two outer fixing edges to abut against an inner side of the circumferential edges of the two upright containers held together;

a first support surface between a first one of the outer fixing edges and a first one of the inner fixing edges, and a second support surface between a second one of the outer fixing edges and a second one of the inner fixing edges, wherein in a use position the first and second support surfaces rest upon the upright circumferential edges of the containers held together; and a first stiffening element at the first outer fixing edge and a second stiffening element at the second outer fixing edge, wherein a height of the outer fixing edges and the stiffening elements which are connected thereto is smaller than a height of the upright circumferential edges of the containers held together, so that in the use position the stiffening elements do not touch the top side of the containers.

3. The method according to claim 2, wherein a front distance between the first and second inner fixing edges at a front side of the first fixing holder has a value of 2%-20% of a radius of the containers.

4. The method according to claim 2, wherein a rear distance between the first and second inner fixing edges at a rear side of the first fixing holder is at least 80% of a width of the tying strap or tensioning cable or the rear distance is chosen from the range of 110%-150% of the width of the tying strap or tensioning cable.

5. The method according to claim 2, wherein a radial distance between the inner fixing edges and the outer fixing edges is 5%-30% greater than a radial thickness of the upright circumferential edges of the containers held together.

6. The method according to claim 2, wherein a height of the inner fixing edges is greater than a height of the outer fixing edges, or the ratio between heights of the inner fixing edges and the outer fixing edges has a range of 1.5:1-5.0:1.

7. The method according to claim 2, wherein a central stiffening body is provided between the first inner fixing edge and the second inner fixing edge.

8. The method according to claim 2, wherein at a rear side of the first fixing holder between the first inner fixing edge and the second inner fixing edge a bevelled or rounded guiding surface is provided for guiding the tying strap or tensioning cable.

9. The method according to claim 2, wherein two positioning ribs are provided on a top side of the first fixing holder for the tying strap or tensioning cable, and wherein a distance between the positioning ribs being equal to or greater than a width of the tying strap or tensioning cable.

10. A system for securing packing units on a transport vehicle comprising:

a first packing unit, which comprises a base and at least two upright, substantially round, containers, the containers are provided at a top side and at a bottom side with upright circumferential edges including flange edges and ring edges, wherein the containers and the upright circumferential edges are positioned against one another on the base and the containers are held together by a cord strap or by otherwise enclosing or girdling the containers;

a first fixing holder, provided on the upright circumferential edges of the at least two upright containers held together of the first packing unit;

a second fixing holder, provided on the two upright circumferential edges of the at least two upright containers held together of the first packing unit or on upright circumferential edges of at least two containers held together of a second packing unit which is identical to the first packing unit; and a tying strap or tensioning cable arranged over the first and second fixing holders and secured to the transport vehicle.

* * * * *